United States Patent [19]

Slobodnik, Jr.

[11] 3,771,072

[45] Nov. 6, 1973

[54] LOW VELOCITY ZERO TEMPERATURE COEFFICIENT ACOUSTIC SURFACE WAVE DELAY LINE HAVING GROUP AND PHASE VELOCITY VECTOR COINCIDENCE

[75] Inventor: Andrew J. Slobodnik, Jr., Burlington, Mass.

[73] Assignee: The United States of America as represented by the Secretary of the United States Air Force, Washington, D.C.

[22] Filed: Dec. 15, 1972

[21] Appl. No.: 315,739

[52] U.S. Cl. .................... 333/30 R, 310/9.5, 333/72
[51] Int. Cl. ........ H03h 7/30, H03h 9/00, H03h 9/30
[58] Field of Search ............................ 333/30 R, 72; 310/8.5, 9.7, 9.8

[56] References Cited

UNITED STATES PATENTS

| | | | |
|---|---|---|---|
| 3,202,846 | 8/1965 | Ballato et al. | 310/9.7 |
| 3,699,482 | 10/1972 | Ash et al. | 333/72 |

*Primary Examiner*—Rudolph V. Rolinec
*Assistant Examiner*—Marvin Nussbaum
*Attorney*—Harry A. Herbert, Jr.

[57] ABSTRACT

An acoustic surface wave delay line having a single crystal tellurium dioxide substrate member the acoustic surface wave propagation surface of which substantially coincides with a plane defined by the Euler angles Lambda = 0°, Mu = 58.2°, and Theta = 0°.

1 Claim, 5 Drawing Figures

LOW VELOCITY ZERO TEMPERATURE COEFFICIENT ACOUSTIC SURFACE WAVE DELAY LINE HAVING GROUP AND PHASE VELOCITY VECTOR COINCIDENCE

BACKGROUND OF THE INVENTION

This invention relates to acoustic surface wave delay lines, and in particular to such devices having both ultra low acoustic surface wave velocities and zero temperature coefficients.

Surface wave acoustic devices are currently coming into widespread systems use for the performance of a variety of delay and signal processing functions. However, for many applications it is highly desirable to use a temperature compensated cut to support the surface waves; that is, a crystalline orientation having zero temperature coefficients of delay. In fact, a review of the current state of the art indicates that a limitation on the application of surface wave encoders and decoders to multiple-access, secure communications systems is the degradation of the peak-to-sidelobe ratio of the autocorrelation function due to temperature differences.

The only temperature compensated cuts presently known are on a quartz. The most widely used is the ST-cut X-propagating orientation. Unfortunately, crystalline quartz possesses a moderately high surface wave velocity which leads to undesirably long substrates for any device constructed using this material.

An acoustic surface wave delay line that exhibits both ultra low velocity and zero temperature coefficient characteristics is disclosed in my copending U.S. Pat. application, Ser. No. 315,746, entitled, Low Velocity Zero Temperature Coefficient Acoustic Surface Wave Delay Line, filed on even date herewith. The delay line disclosed therein is a low velocity, zero temperature coefficient device having an acceptably high piezoelectric coupling constant and, as such, represents a substantial improvement over other state of the art devices. The particular crystalline cut comprehended thereby exhibits significant group and phase velocity vector deviation, however. Although this does not detract from the effectiveness of the device, offset transducer are required. This of course increases fabrication complexity and cost.

Accordingly, there exists a need for ultra low velocity, zero temperature coefficient acoustic surface wave delay lines that have group and phase velocity vector coincidence and that are adaptable to simple inexpensive fabrication techniques. The present invention is directed toward satisfying this need.

SUMMARY OF THE INVENTION

This invention utilizes acoustic surface wave propagation on a propagating surface that coincides with particular crystalline axes of tellurium dioxide to provide room temperature zero temperature coefficient delay lines and matched filters adapted to use in very small spaces. The propagating surface is defined by a plane that substantially coincides wih Euler angles Lambda = 0°, Mu = 58.2°, and Theta = 0°. RF energy is converted to acoustic energy by an electromagnetic wave to acoustic surface wave input transducer. The acoustic energy propagates on the tellurium dioxide surface and is finally reconverted to RF energy by an acoustic surface wave to electromagnetic wave output transducer. The very low velocity of the particular propagating surface orientation used allows very long delay time for a given crystal size. The zero temperature coefficient of delay characteristics possessed by tellurium dioxide permits these delay lines and filters to be used in many systems that require RF time delay and signal processing without costly and bulky oven and temperature feedback controls.

It is a principal object of the invention to provide a new and improved acoustic surface wave delay line.

It is another object of the invention to provide acoustic surface wave delay lines and filters having both ultra low acoustic surface wave velocities and zero temperature coefficient of delay.

It is another object of the invention to provide small light-weight delay devices that are capable of effecting long RF delays and that do not require temperature stabilization ovens or feedback controls.

It is another object of the invention to provide an acoustic surface wave delay line of the type described having group and phase velocity vector coincidence.

These, together with other objects, features and advantages of the invention will become more readily apparent from the following detailed description when taken in conjunction with the illustrated embodiment of the accompanying drawings.

DECRIPTION OF THE DRAWINGS

FIG. 1 illustrates a tellurium dioxide crystal substrate member cut to the particular crystalline orientation comprehended by the invention;

FIGS. 2*a*, 2*b* and 2*c* illustrate the coordinate system used to define acoustic surface wave propagation in terms of Euler angles; and FIG. 3 is a plan view of an acoustic surface wave delay line as comprehended by the invention.

DETAILED DESCRIPTION OF THE PREFERRED EMBODIMENT

Figure 1:
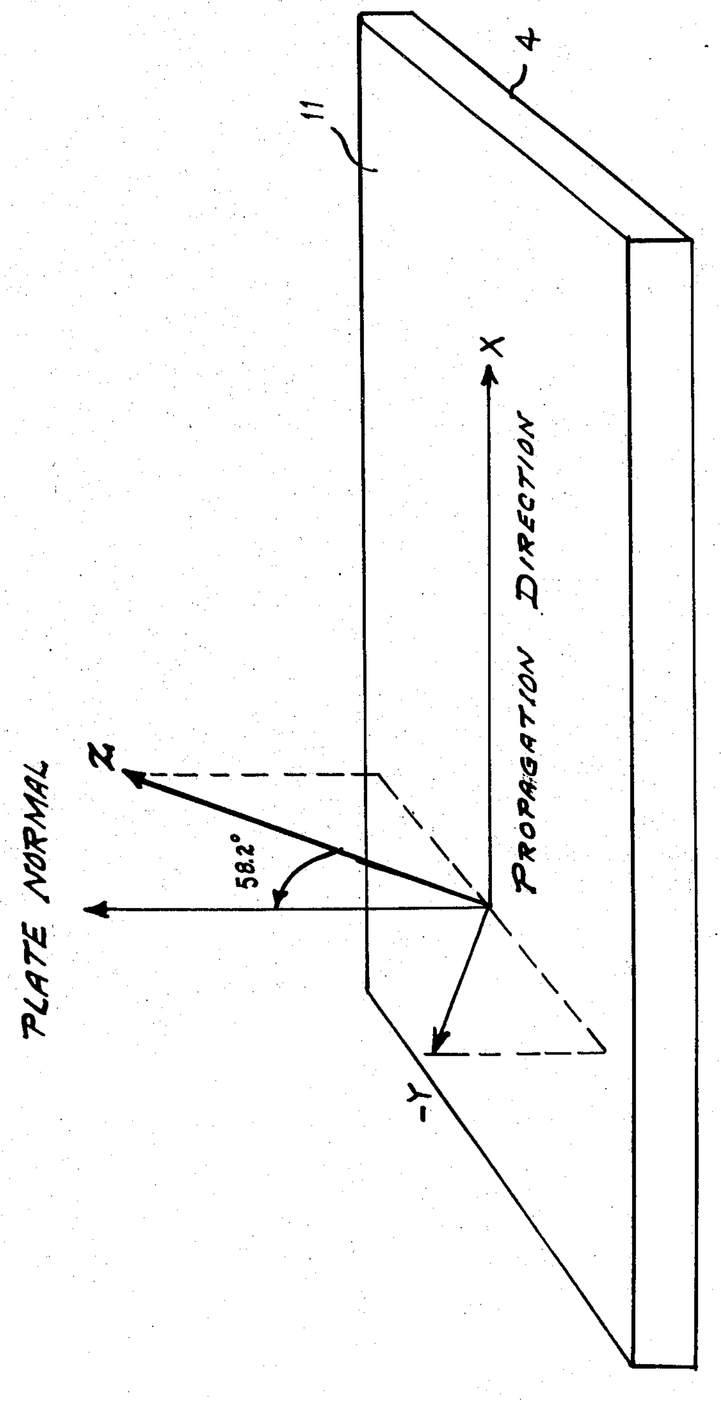

Referring now to FIG. 1, there is illustrated thereby a single crystal tellurium dioxide substrate member 4 having an acoustic surface wave propagating surface 11 cut in accordance with the principles of the present invention. Such a cut must substantially conform to a plane defined by Euler angles Lambda = 0°, Mu = 58.2°, and Theta = 0°.

Figure 2A:
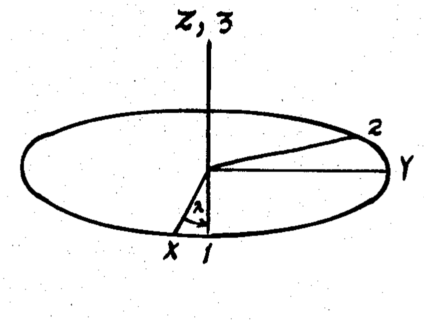
Figures 2B, 2C:
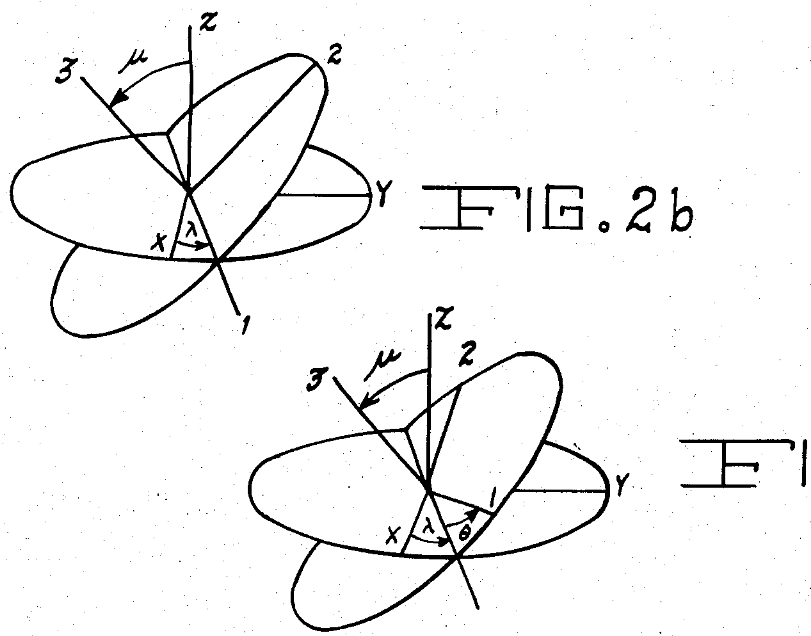

The coordinate system used to define acoustic surface wave propagation in terms of Euler angles is illustrated by FIGS. 2*a*, 2*b*, and 2*c*. The phase velocity vector lies along the 1 axis while the plate normal lies along the negative 3 axis. The crystalline axes are given by X, Y and Z, while the Euler angles are Lambda, Mu and Theta. FIGS. 2*a*, 2*b* and 2*c* illustrate the standard coordinate system in which the propagation axes line up with the crystalline X, Y and Z axes. It follows therefore that the standard Euler angle notation Lambda = 0°, Mu = 58.2° and Theta = 0° specified above refers to rotation in the YZ plane starting with a propagation direction along the X axis and a plate normal along the Z axis.

Figure 3:
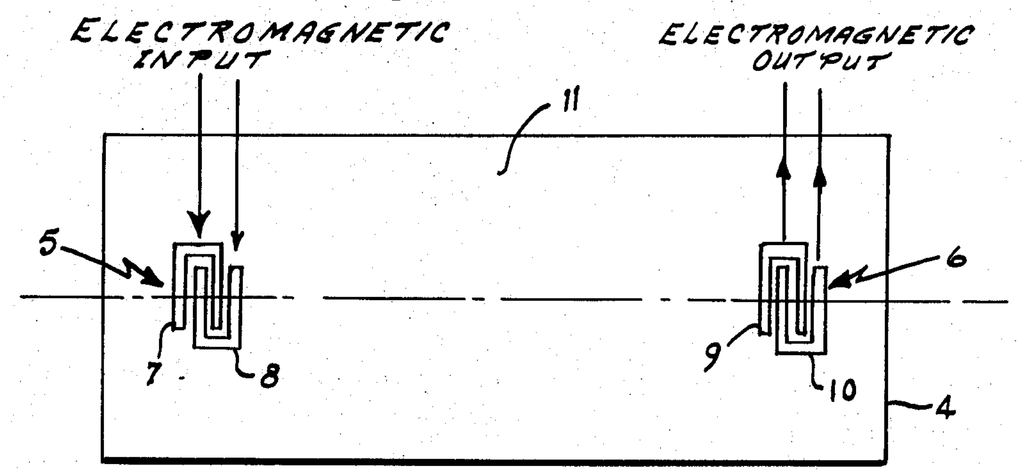

An acoustic surface wave delay line incorporating the principles of the present invention is illustrated by FIG. 3. It comprises substrate member 4, electromagnetic wave to acoustic surface wave input transducer 5 and acoustic surface wave to electromagnetic wave output transducer 6. Substrate member 4 is fabricated of single crystal tellurium dioxide and has its propagation surface 11 cut to conform with the above-designated Euler angles. Input transducer 5 consists of interdigital fingers 7 and 8 which may be affixed to the propagating surface 11 by standard photolithographic techniques. Output transducer 6, consisting of interdigital fingers 9 and 10, is similarly affixed to propagation surface 11. Tellurium dioxide with the particular propagation surface cut comprehended by the invention has a coupling parameter $\Delta V/_V = 0.00002$. Accordingly it is also intended that other state of the art means for launching and detecting acoustic surface waves be an integral part of the invention. These include the combination of interdigital transducers and thin piezoelectric films, bulk to surface wave conversion means, wedge techniques and other coupling enhancing devices. The geometry, dimensions and relative positions of the transducers are determined by the operating frequency, delay time requirement and other parameters of the particular device specified. The distance between the launching and receiving structures determines the delay time according to the formula:

delay time (seconds) = distance (meters)/1387 where 1387 meters/seconds is the surface wave velocity.

The particular propagation surface cut of the present invention coincides with a pure mode orientation; that is, the phase and group velocity vectors coincide. Consequently the input and output transducers can be aligned as illustrated by FIG. 3. This is a substantial manufacturing advantage since it greatly simplifies fabrication procedures. The delay lines of the present invention can be utilized in filter applications by using coded transducers. This can be accomplished by varying transducer finger widths and spacings, by inverting appropriate fingers and by amplitude and frequency weighting.

While the invention has been described in one presently preferred embodiment, it is undertood that the words which have been used are words of description rather than words of limitation and that changes within the purview of the appended claims may be made without departing from the scope and spirit of the invention in its broader aspect.

What is claimed is:

1. An acoustic surface wave delay line comprising a single crystal tellurium dioxide substrate member having a propagation surface defined by a plane that substantially coincides with the Euler angles Lambda = 0°, Mu = 58.2°, and Theta = 0°, an electromagnetic wave to acoustic surface wave input transducer disposed on said propagation surface, and an acoustic surface wave to electromagnetic wave output transducer disposed on said propagation surface.

* * * * *